United States Patent
Spick et al.

(10) Patent No.: US 11,971,471 B2
(45) Date of Patent: Apr. 30, 2024

(54) METHOD FOR DETECTING THE APPROACH OF AN OBJECT ON A LATERAL SIDE OF A MOVING VEHICLE AND ON-BOARD ASSOCIATED DETECTION DEVICE

(71) Applicant: VITESCO TECHNOLOGIES GMBH, Hanover (DE)

(72) Inventors: Gabriel Spick, Toulouse (FR); Olivier Elie, Toulouse (FR); Olivier Gerardiere, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 588 days.

(21) Appl. No.: 17/270,319

(22) PCT Filed: Aug. 19, 2019

(86) PCT No.: PCT/EP2019/072152
§ 371 (c)(1),
(2) Date: Feb. 22, 2021

(87) PCT Pub. No.: WO2020/038891
PCT Pub. Date: Feb. 27, 2020

(65) Prior Publication Data
US 2021/0173072 A1    Jun. 10, 2021

(30) Foreign Application Priority Data
Aug. 23, 2018    (FR) .................................... 1857611

(51) Int. Cl.
*G01S 13/58*    (2006.01)
*G01S 7/41*    (2006.01)
(Continued)

(52) U.S. Cl.
CPC ............. *G01S 13/588* (2013.01); *G01S 7/411* (2013.01); *G01S 13/003* (2013.01);
(Continued)

(58) Field of Classification Search
CPC ...... G01S 13/588; G01S 7/411; G01S 13/003; G01S 13/931; G01S 2013/9315;
(Continued)

(56) References Cited

U.S. PATENT DOCUMENTS

| | | |
|---|---|---|
| 6,657,581 B1 | 12/2003 | Lippert et al. |
| 6,708,100 B2 | 3/2004 | Russell et al. |

(Continued)

FOREIGN PATENT DOCUMENTS

| | | |
|---|---|---|
| CN | 102187376 A | 9/2011 |
| CN | 105022023 A | 11/2015 |

(Continued)

OTHER PUBLICATIONS

International Search Report for PCT/EP2019/072152 dated Nov. 19, 2019, 6 pages.
(Continued)

*Primary Examiner* — Peter M Bythrow
(74) *Attorney, Agent, or Firm* — NIXON & VANDERHYE

(57) ABSTRACT

Disclosed is a method for detecting the approach of an object on a lateral side of a moving motor vehicle with door handles on lateral sides, each including an ultra-high-frequency antenna detecting a portable user apparatus near the vehicle and identifying it to validate hands-free access to the vehicle for the user, the method including: each antenna emitting an electromagnetic field, a first radiated power per steradian of which, in a first zone directed outside of the vehicle and defined by a first aperture angle, is greater than a second radiated power per steradian in a second, lateral (Continued)

zone directed toward the other antenna and defined by a second aperture angle; and, when the vehicle is moving, validating approach detection by antenna reception of an electromagnetic field emitted by the other antenna and reflected by the object, whose received power is higher than a predetermined minimum received power.

20 Claims, 3 Drawing Sheets

(51) Int. Cl.
  *G01S 13/00* (2006.01)
  *G01S 13/931* (2020.01)
  *H01Q 1/32* (2006.01)
(52) U.S. Cl.
  CPC ......... *G01S 13/931* (2013.01); *H01Q 1/3283* (2013.01); *G01S 2013/9315* (2020.01); *G01S 2013/93274* (2020.01)
(58) Field of Classification Search
  CPC ........ G01S 2013/93274; H01Q 1/3283; B60R 25/24; B60R 25/245; H04W 4/02; H04W 4/023; H04W 4/40
  See application file for complete search history.

(56) References Cited

U.S. PATENT DOCUMENTS

| | | | |
|---|---|---|---|
| 6,744,353 B2 | 6/2004 | Sjoenell | |
| 6,864,831 B2 | 3/2005 | Woodington et al. | |
| 6,970,142 B1 | 11/2005 | Pleva et al. | |
| 7,504,986 B2 | 3/2009 | Brandt et al. | |
| 8,095,276 B2 | 1/2012 | Kozyreff et al. | |
| 9,607,517 B2 | 3/2017 | Schräbler et al. | |
| 10,136,256 B2* | 11/2018 | Godet | G01S 11/06 |
| 10,403,068 B2* | 9/2019 | Tachibana | G07C 9/00309 |
| 10,502,826 B2 | 12/2019 | Tasovac et al. | |
| 11,255,961 B2* | 2/2022 | Yu | G01S 13/931 |
| 2003/0001772 A1 | 1/2003 | Woodington et al. | |
| 2003/0004633 A1 | 1/2003 | Russell et al. | |
| 2003/0052773 A1 | 3/2003 | Sjonell | |
| 2007/0179712 A1 | 8/2007 | Brandt et al. | |
| 2010/0094508 A1 | 4/2010 | Kozyreff et al. | |
| 2014/0350793 A1* | 11/2014 | Schrabler | G08G 1/16 342/450 |
| 2015/0245167 A1* | 8/2015 | Bobrow | H04W 4/80 455/41.2 |
| 2015/0268336 A1* | 9/2015 | Yukumatsu | G01S 13/04 342/175 |
| 2015/0358778 A1* | 12/2015 | Heo | H04W 4/027 455/456.6 |
| 2017/0272907 A1 | 9/2017 | Godet et al. | |
| 2017/0282856 A1* | 10/2017 | Riedel | B60R 25/24 |
| 2018/0136655 A1* | 5/2018 | Kim | B60R 22/48 |
| 2018/0164429 A1 | 6/2018 | Tasovac et al. | |
| 2018/0330560 A1* | 11/2018 | Hiramine | B60R 25/24 |
| 2019/0147678 A1* | 5/2019 | Saiki | B60R 25/24 340/5.64 |
| 2019/0369232 A1* | 12/2019 | Yu | G01S 13/04 |
| 2020/0120458 A1* | 4/2020 | Aldana | H04W 72/23 |

FOREIGN PATENT DOCUMENTS

| | | |
|---|---|---|
| CN | 107810430 A | 3/2018 |
| DE | 100 07 500 | 9/2001 |
| DE | 102012221264 A1 | 5/2013 |
| FR | 3 049 065 | 9/2017 |
| JP | 2005500537 A | 1/2005 |
| SE | 9904591 L | 6/2001 |

OTHER PUBLICATIONS

Written Opinion of the ISA for PCT/EP2019/072152 dated Nov. 19, 2019, 6 pages.

Office Action, issued in Chinese Patent Application No. 201980055344.3 dated Oct. 19, 2023.

* cited by examiner

METHOD FOR DETECTING THE APPROACH OF AN OBJECT ON A LATERAL SIDE OF A MOVING VEHICLE AND ON-BOARD ASSOCIATED DETECTION DEVICE

CROSS-REFERENCE TO RELATED APPLICATIONS

This application is the U.S. national phase of International Application No. PCT/EP2019/072152 filed Aug. 19, 2019 which designated the U.S. and claims priority to FR 1857611 filed Aug. 23, 2018, the entire contents of each of which are hereby incorporated by reference.

BACKGROUND OF THE INVENTION

Field of the Invention

The invention relates to a method for detecting the approach of an object on a lateral side of a moving motor vehicle and to an associated detection device which is on board said motor vehicle.

Description of the Related Art

Nowadays, and despite technological progress, the detection of the approach of an object on a lateral side of a moving motor vehicle by a motorist driving said vehicle, and more specifically the detection of vehicles approaching on one of the lateral sides of the vehicle, either on the side where the driver is located or on the side where the front passenger is located, remains problematic and is the cause of many accidents. If the driver does not see the approaching vehicle in their rearview mirror because said approaching vehicle is in the blind spot of the field of the rearview mirror, they may decide to overtake a vehicle located in front of their vehicle, thus risking a collision with the vehicle that is approaching from one of the rear lateral sides.

The solutions of the prior art consist in supplementing the front rearview mirrors with a magnifying mirror or in fitting the vehicle with an additional camera that displays the objects located in the vicinity of the vehicle in the blind spot of the rearview mirrors.

The first solution is generally unsatisfactory and does not make it possible to see the entire field located in the blind spot, and the second solution is too costly to be provided in low-end or mid-range vehicles.

It is therefore necessary to overcome the drawbacks of the prior art and to be able to offer the driver a means of detecting objects in the blind spot of their rearview mirrors.

SUMMARY OF THE INVENTION

The invention relates to a method for detecting the approach of an object on a lateral side of a moving motor vehicle, said vehicle being fitted with door handles on said lateral side, each of which includes an ultra-high-frequency antenna designed, when the vehicle is stationary, to detect the presence of a portable user apparatus in the vicinity of the vehicle and to identify said apparatus in order to validate hands-free access to the vehicle for the user, said method being noteworthy in that:

the antennas are initially adapted such that each one of said antennas emits an electromagnetic field, a first radiated power per steradian of which, in a first zone oriented toward the outside of the vehicle and defined by a first aperture angle, is greater than a second radiated power per steradian in a second, lateral zone directed toward the other antenna and defined by a second aperture angle, and, when the vehicle is moving, the detection of the approach of the object is validated by the reception, by at least one antenna, of an electromagnetic field emitted by the other antenna and reflected by the object, the received power of which is higher than a predetermined minimum received power.

Preferably, the first aperture angle is greater than the second aperture angle.

Advantageously, the approach detection method also comprises detecting the overtaking of the vehicle, characterized in that the overtaking detection is validated if the received power of the electromagnetic field remains above the predetermined minimum received power for a period of time longer than a predetermined period of time.

Judiciously, the first radiated power is higher than the second radiated power by at least 10 dBi.

The method according to the invention is noteworthy in that a slope is calculated for the increase in the value of the received power over time in order to determine a speed of approach of the object on the basis of a driving speed of said vehicle.

The invention also relates to a device for detecting the approach of an object on a lateral side of a moving motor vehicle, said device being incorporated in door handles on said lateral side of said vehicle, each of which includes an ultra-high-frequency antenna designed, when the vehicle is stationary, to detect the presence of a portable user apparatus in the vicinity of the vehicle and to identify said apparatus in order to validate hands-free access to the vehicle for the user, said device being noteworthy in that it further comprises:

means for adapting the antennas such that each one of said antennas emits an electromagnetic field, a first radiated power per steradian of which, in a first zone oriented toward the outside of the vehicle and defined by a first aperture angle, is greater than a second radiated power per steradian in a second, lateral zone directed toward the other antenna and defined by a second aperture angle, while the vehicle is moving, means for measuring a power of the electromagnetic field received by each antenna, means for comparing the value of the received power with a predetermined minimum received power, means for storing the predetermined received power.

The device may comprise:

a clock H comprising means for measuring a period of time, means for comparing a measured period of time during which the received power is higher than the minimum received power with a predetermined period of time, additional means for storing the predetermined period of time.

Judiciously, the antenna adapting means are in the form of metal shielding and/or unidirectional antennas.

The invention also applies to any motor vehicle comprising a detection device according to any one of the features set out above.

BRIEF DESCRIPTION OF THE DRAWINGS

Other aims, features and advantages of the invention will become apparent upon reading the following description provided by way of non-limiting example and upon examining the appended drawings, in which.

DESCRIPTION OF THE PREFERRED EMBODIMENTS

As explained above, there is no satisfactory prior art solution for detecting the approach of an object, in this case for detecting the approach of a vehicle on a lateral side of another moving vehicle.

It is known practice to use BLE® (Bluetooth Low Energy) ultra-high-frequency antennas on a vehicle and more specifically in the door handles of a vehicle in order to locate a fob or a portable user apparatus around the vehicle and in order to then identify same as being paired with the vehicle and to perform automatic "hands-free" unlocking (or locking) of the vehicle upon the user approaching (or moving away). This detection thus allows the user to unlock/lock their vehicle without physically having to actuate a key.

The use of BLE® antennas has several advantages; but in particular BLE® technology is present on most portable user apparatuses. Thus, the user may use a cell phone or the like to access their vehicle, and not only the hands-free access fob that operates with RF, LF (radio frequency and low frequency, respectively) technology, i.e. using a radio frequency between 30 kHz and 300 kHz.

BLE is understood to mean any ultra-high-frequency wireless communication, i.e. at a frequency from 300 MHz to 3 GHz or from 100 MHz to over 3 GHz, for example from 2 GHz to 5 GHz for Wi-Fi®.

Figure 1A:
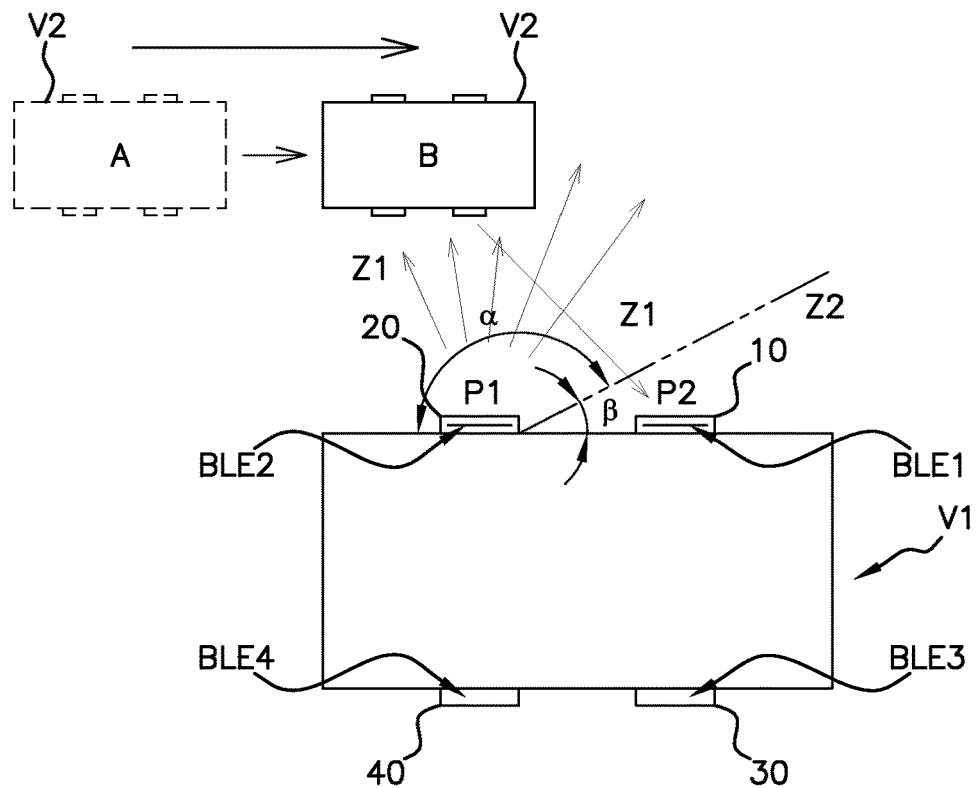
FIG. 1a is a schematic view of an object, in this case of a vehicle, approaching from a position A in dashed lines to a position B on a lateral side of a moving vehicle which is implementing the approach detection method according to the invention.

This is illustrated in FIG. 1a; the vehicle V1 comprises BLE antennas, a first antenna BLE1 and a second antenna BLE2, in each door handle 10, 20 on at least one lateral side of the vehicle, more specifically on the driver side.

The vehicle may of course comprise BLE antennas BLE3, BLE4 on the other lateral side, the passenger side, said antennas being incorporated in the handles 30, 40.

The BLE antennas are thus called upon only when the vehicle is at a standstill to perform location, identification and locking/unlocking intention validation functions.

The method according to the invention proposes also using said BLE antennas when the vehicle is moving, in order to detect the approach of an object on a lateral side of said vehicle.

The detection method according to the invention will now be described.

Initially (step E0, cf. FIG. 5), the antennas BLE1, BLE2 in the handles 10, 20 are adapted such that each one of said antennas BLE1, BLE2 emits an electromagnetic field, a first radiated power P1 per steradian of which, in a first zone Z1 oriented toward the outside of the vehicle and defined by a first aperture angle α, is greater than a second lateral radiated power P2 per steradian in a second zone Z2 directed toward the other antenna and defined by a second aperture angle β.

This is illustrated in FIG. 1a. In other words, the antennas BLE1, BLE2 are configured to emit a more powerful electromagnetic field in a first zone Z1 oriented toward the outside of the vehicle than in a second zone Z2 oriented toward the other antenna BLE1, BLE2. Preferably, the first aperture angle α is greater than the second aperture angle β so that the first zone Z1 covered by the electromagnetic field emitted by the antenna BLE1, BLE2 is larger than the second zone Z2.

Preferably, the first radiated power P1 per steradian is at least 10 dBi higher than the second radiated power P2 per steradian.

Thus, in the absence of the detection of an object approaching the vehicle V1, whether the vehicle V1 is stationary or moving, the magnetic field received by one antenna BLE1, BLE2 from the other antenna BLE1, BLE2 will be as weak as possible or even nonexistent. Thus, in the absence of an object in the vicinity of the side where the antennas are located, an antenna BLE1, BLE2 does not receive the electromagnetic field emitted by the other antenna BLE1, BLE2, or receives it to a limited extent.

It is important to note that the first power P1 per steradian must be higher than the second power per steradian; these are not average powers. In order for the invention to work, for each direction included in the first aperture angle α, the first power P1 must be higher than the second power P2 in any direction included in the second aperture angle β.

Preferably, the first aperture angle α is greater than the second aperture angle β.

When an object approaches on a lateral side of the vehicle, for example when a second vehicle V2 approaches, from a position A, in dashed lines in FIG. 1a, located behind the vehicle V1, to a position B, located on a lateral side of the vehicle V1, the electromagnetic field emitted by the second antenna BLE2 is reflected by the metal structure of the vehicle V2, and a part of the reflected electromagnetic field is redirected toward the first antenna BLE1.

Figure 4:
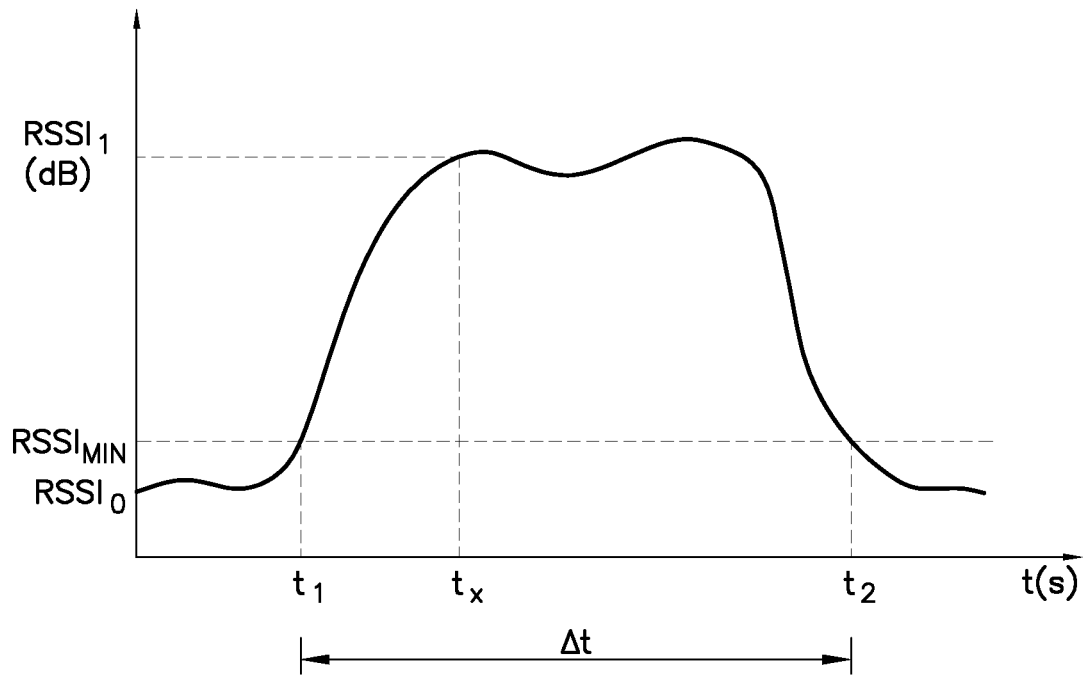
FIG. 4 is a graph illustrating the power that is received by an antenna and is representative of an object approaching and overtaking on a lateral side of a vehicle.

The first antenna BLE1 then detects an increase in the power of the electromagnetic field that it receives. This is illustrated in FIG. 4.

Figure 5:
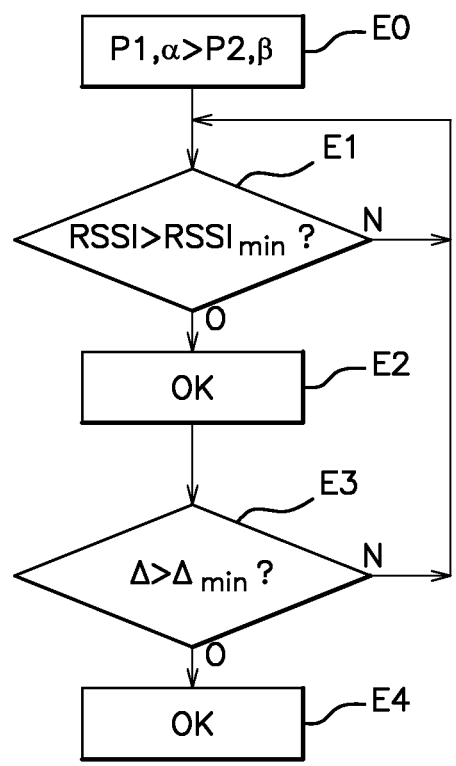
FIG. 5 is a flowchart illustrating the detection method.

If the value of the power of the received signal, also known as RSSI ("Received Signal Strength Indication"), which will be denoted RSSI1 for the first antenna BLE1, increases and exceeds a predetermined minimum received power value $RSSI_{MIN}$ at the instant t1 (step E1, FIG. 5), then the approach detection of the object, in the present case of the second vehicle V2 on a lateral side of the vehicle V1, in this case the side where the second antenna BLE2 is located, is validated (step E2, FIG. 5).

Figure 1B:
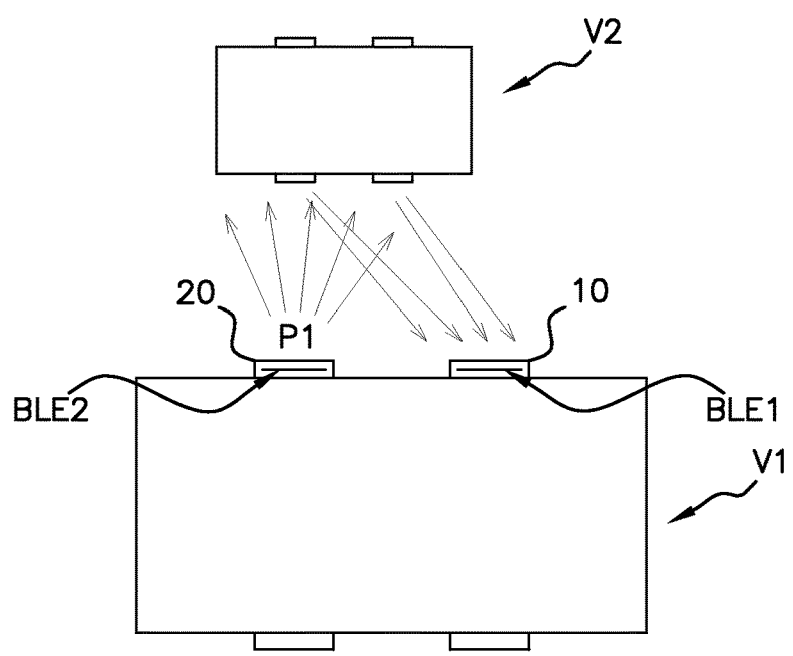
FIG. 1b is a schematic view of an object, in this case of a vehicle, which is overtaking a moving vehicle that is implementing the approach detection method, and more specifically the overtaking detection method, according to the invention.

In one refinement of the invention, when the value of said received power RSSI1 remains above the predetermined minimum received power $RSSI_{MIN}$ for a period of time Δ longer than a predetermined period of time Δmin, (cf. FIG. 4 and step E3 in FIG. 5), then the detection not only of the approaching but also of the overtaking of the vehicle V1 by the second vehicle V2 is validated. This is illustrated in FIG. 1b.

When the vehicle V1 is approached by the second vehicle V2, the first antenna BLE1 also receives a power RSSI2 of the electromagnetic field emitted by the second antenna BLE2 and reflected by the second vehicle V2, which is higher than a second predetermined threshold, $RSSI_{MIN2}$, the value of which is equal to or different from the predetermined power threshold $RSSI_{MIN}$ of the second antenna BLE2. If said received power value RSSI2 remains above the predetermined minimum value $RSSI_{MIN2}$ for a period of time $\Delta 2$ longer than a predetermined period of time $\Delta min2$, then the detection of the overtaking is validated.

Thus, the measurement of the power received by the first antenna BLE1 makes it possible to confirm the approaching and then the overtaking of the vehicle V1 by the second vehicle V2, which has been detected by the second antenna BLE2.

Since the location of the antennas BLE1, BLE2 on the vehicle V1 is known by the central electronic control system of the vehicle, said control system may thus use the analysis of the signals of the power received by the antennas BLE1, BLE2 to determine which antenna the second vehicle V2 is in the proximity of.

Analyzing the increase in the received power over time (i.e. the slope of the signal) makes it possible, on the basis of the driving speed of the vehicle V1, to determine the speed of approach of the second vehicle V2. This is because the power-over-time slope is proportional to the difference in speed between the two vehicles V1, V2.

This is illustrated in FIG. 4; the received power increases from a received power RSSI0 at $t=t1$ to a received power of RSSI1 at $t=tx$. The slope P is thus calculated:

$$P = \frac{\Delta RSSI}{\Delta t} = \frac{(RSSI1 - RSSI0)}{tx - t1}$$

and said P is a function of the speeds of the vehicle V1 and of the approaching vehicle V2

$$P = f(\vec{v1}, \vec{v2})$$

with $\vec{v1}$: speed of the vehicle V1, $\vec{v2}$: speed of the approaching vehicle V2.

This function may be derived during preliminary calibration tests and then recorded or stored in storage means in a controller of the detection device (see below).

Since the speed of the vehicle V1 is known, the speed of the second vehicle V2 can thus be derived therefrom by means of this function.

Figure 2:
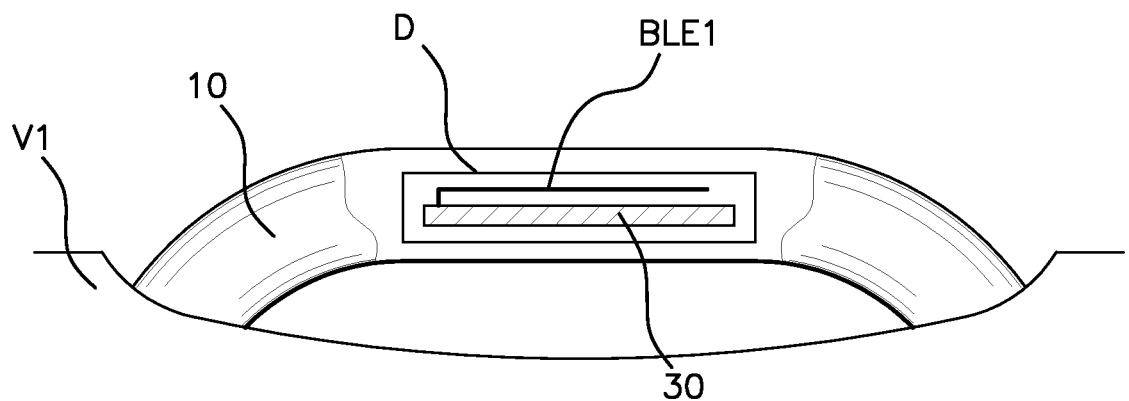
FIG. 2 is a schematic view of a door handle P that incorporates the detection device according to the invention.

The method is implemented by a detection device D incorporated in the handle 10 (cf. FIG. 2), comprising a BLE antenna BLE1 that is, for example, connected to a control circuit 30 located, for example, in a printed circuit board.

Figure 3:
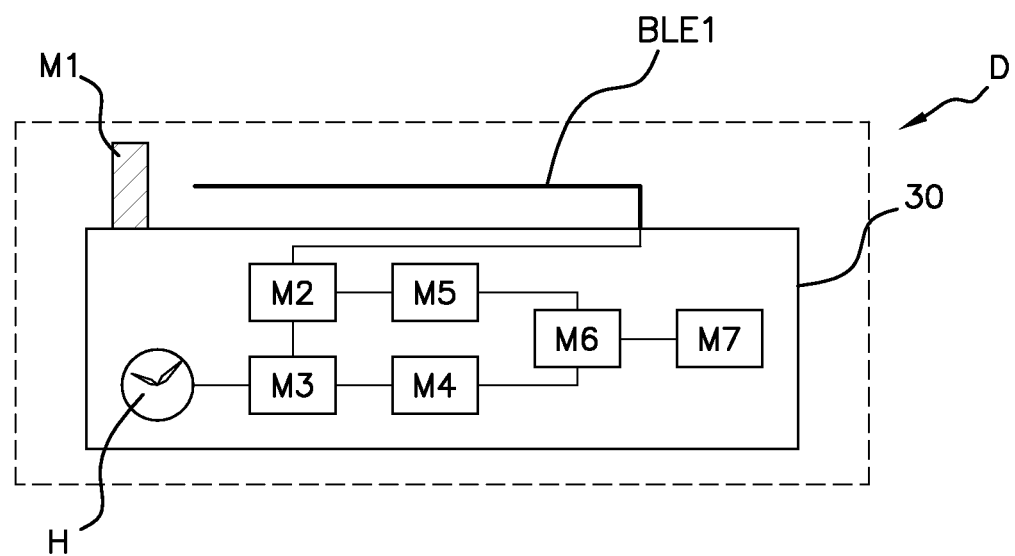
FIG. 3 is a detailed schematic view of the detection device according to the invention.

In order to carry out the detection method according to the invention, the detection device D further comprises (cf. FIG. 3):

an ultra-high-frequency antenna BLE1, BLE2, means M1 for adapting antennas such that each one of said antennas BLE1, BLE2 emits an electromagnetic field, a first radiated power P1 per steradian of which, in a first zone Z1 oriented toward the outside of the vehicle and defined by a first aperture angle α, is greater than a second lateral radiated power P2 per steradian in a second zone Z2 directed toward the other antenna BLE2, BLE1 and defined by a second aperture angle β, while the vehicle V1 is moving, means M2 for measuring the electromagnetic field received by each antenna BLE1, BLE2, means M3 for comparing the value of the received power RSSI1, RSSI2 with a predetermined minimum received power $RSSI_{MIN}$, $RSSI_{MIN2}$, means M6 for storing the predetermined minimum received power $RSSI_{MIN}$, $RSSI_{MIN2}$ and in the refined embodiment of the invention, the detection device D further comprises:

a clock H comprising means for measuring a period of time, means M4 for comparing a measured period of time $\Delta$, $\Delta 2$ during which the received power is higher than the minimum received power with a predetermined period of time $\Delta min$, $\Delta min2$, additional means M7 for storing the predetermined period of time $\Delta min$, $\Delta min2$.

The means for adapting antennas BLE1, BLE2 may be in various forms known to a person skilled in the art:

either a metal shield around the antenna BLE1, BLE2, included in the detection device D or optionally on the handle 10, 20, which shield performs the function of an electromagnetic wave reflector, making it possible to orient and/or adjust the power of the electromagnetic field in an aperture angle, or via the use of unidirectional antennas which therefore emit in a favored direction, or any other means known to a person skilled in the art.

The means M2 for measuring the electromagnetic field are in the form of an electronic receiving circuit known to a person skilled in the art.

The clock H may be an electronic clock.

The comparing means M3, M4 and the storage means M6 are in the form of software integrated in a microprocessor-type controller located in the printed circuit board.

The antenna BLE1, BLE2 is electrically connected to control means 30 comprising:

the means M2 for measuring the electromagnetic field received by each antenna BLE1, BLE2, the means M3 for comparing the value of the received power RSSI1, RSSI2 with a predetermined minimum received power $RSSI_{MIN}$, $RSSI_{MIN2}$, the clock H comprising means for measuring a period of time, the means M4 for comparing a measured period of time $\Delta$, $\Delta 2$ during which the received power is higher than the minimum received power with a predetermined period of time $\Delta min$, $\Delta min2$, the means M6 for storing the predetermined minimum received power $RSSI_{MIN}$, $RSSI_{MIN2}$ and the additional means M7 for storing the predetermined period of time $\Delta min$, $\Delta min2$.

In order to implement a refinement of the invention set forth above, the detection device D may comprise storage means in the controller for storing the function connecting the received power on the basis of the speeds of the two vehicles, V1 and V2

$$P = f(\vec{v1}, \vec{v2})$$

with $\vec{v1}$: speed of the vehicle V1, $\vec{v2}$: speed of the approaching vehicle V2.

The invention thus makes it possible to judiciously use the ultra-high-frequency antennas that are arranged on the vehicle during driving of the vehicle in order to detect the approach of an object on a lateral side of the vehicle, whereas said antennas were hitherto used only during stationary vehicle phases.

The method is simple to implement and inexpensive.

The invention claimed is:

1. A method for detecting an approach of an object on a lateral side of a moving motor vehicle, said vehicle being fitted with door handles on said lateral side, each of which includes an ultra-high-frequency antenna configured, when the vehicle is stationary, to detect a presence of a portable user apparatus in a vicinity of the vehicle and to identify said apparatus in order to validate hands-free access to the vehicle for a user, said method comprising:

emitting, by each one of the antennas an electromagnetic field, a first radiated power per steradian of which, in a first zone oriented toward the outside of the vehicle and defined by a first aperture angle, is greater than a second radiated power per steradian in a second, lateral zone directed toward another one of the antennas and defined by a second aperture angle; and when the vehicle is moving, validating detection of the approach of the object by receiving, by at least one of the antennas the electromagnetic field emitted by the other one of the antennas and reflected by the object a received power of which is higher than a predetermined minimum received power.

2. The detection method as claimed in claim 1, wherein the first aperture angle is greater than the second aperture angle.

3. The detection method as claimed in claim 1, further comprising detecting overtaking of the vehicle when the received power of the electromagnetic field is higher than the predetermined minimum received power for a period of time longer than a predetermined period of time.

4. The detection method as claimed in claim 1, wherein the first radiated power is higher than the second radiated power by at least 10 dBi.

5. The detection method as claimed in claim 1, further comprising calculating a slope for an increase in a value of the received power over time in order to determine a speed of approach of the object in the basis of based on a driving speed of said vehicle.

6. A device for detecting an approach of an object on a lateral side of a moving motor vehicle, said device configured to be incorporated in door handles on said lateral side of said vehicle, each of which includes an ultra-high-frequency antenna configured, when the vehicle is stationary, to detect a presence of a portable user apparatus in a vicinity of the vehicle and to identify said apparatus in order to validate hands-free access to the vehicle for a user, said device comprising:

at least one processor configured to:

cause each one of said antennas to emit an electromagnetic field, a first radiated power per steradian of which, in a first zone oriented toward the outside of the vehicle and defined by a first aperture angle, is greater than a second radiated power per steradian in a second, lateral zone directed toward another one of the antennas and defined by a second aperture angle, while the vehicle is moving, m measure a power of the electromagnetic field received by each of the antennas, compare the value of a received power with a predetermined minimum received power, and store the received power.

7. The detection device as claimed in claim 6, further comprising:

a clock configured to measure a period of time, a comparator configured to compare a measured period of time during which the received power is higher than the minimum received power with a predetermined period of time, and a storage configured to store the predetermined period of time.

8. The detection device as claimed in claim 6, wherein the antennas are one or more of metal shielding and unidirectional antennas.

9. A motor vehicle, comprising:

the detection device as claimed in claim 6.

10. The detection method as claimed in claim 2, further comprising detecting overtaking of the vehicle, when the received power of the electromagnetic field is higher than the predetermined minimum received power for a period of time longer than a predetermined period of time.

11. The detection method as claimed in claim 2, wherein the first radiated power is higher than the second radiated power by at least 10 dBi.

12. The detection method as claimed in claim 3, wherein the first radiated power is higher than the second radiated power by at least 10 dBi.

13. The detection method as claimed in claim 2, further comprising calculating a slope for an increase in a value of the received power over time in order to determine a speed of approach of the object based on a driving speed of said vehicle.

14. The detection method as claimed in claim 3, further comprising calculating a slope for an increase in a value of the received power over time in order to determine a speed of approach of the object based on a driving speed of said vehicle.

15. The detection method as claimed in claim 4, further comprising calculating a slope for an increase in a value of the received power over time in order to determine a speed of approach of the object based on a driving speed of said vehicle.

16. The detection device as claimed in claim 7, wherein the antennas are one or more of metal shielding and unidirectional antennas.

17. A motor vehicle, comprising:

the detection device as claimed in claim 7.

18. A motor vehicle, comprising:

the detection device as claimed in claim 8.

19. The detection method as claimed in claim 10, wherein the first radiated power is higher than the second radiated power by at least 10 dBi.

20. The detection method as claimed in claim 10, further comprising calculating a slope for an increase in a value of the received power over time in order to determine a speed of approach of the object based on a driving speed of said vehicle.

\* \* \* \* \*